No. 633,698. Patented Sept. 26, 1899.
D. MELCHER.
WATER COOLER AND FILTER.
(Application filed Nov. 22, 1897.)
(No Model.)
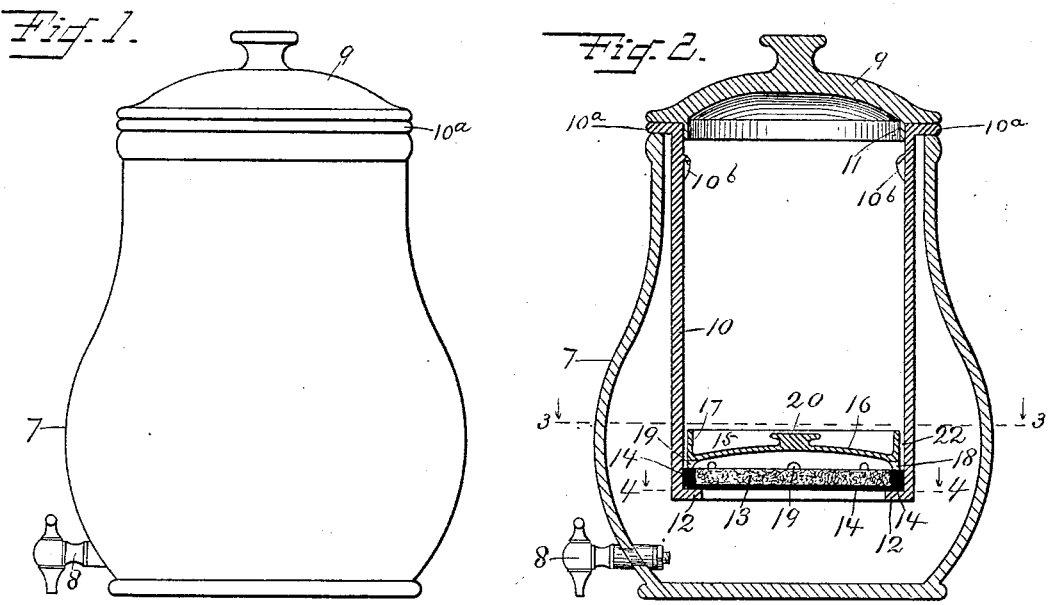
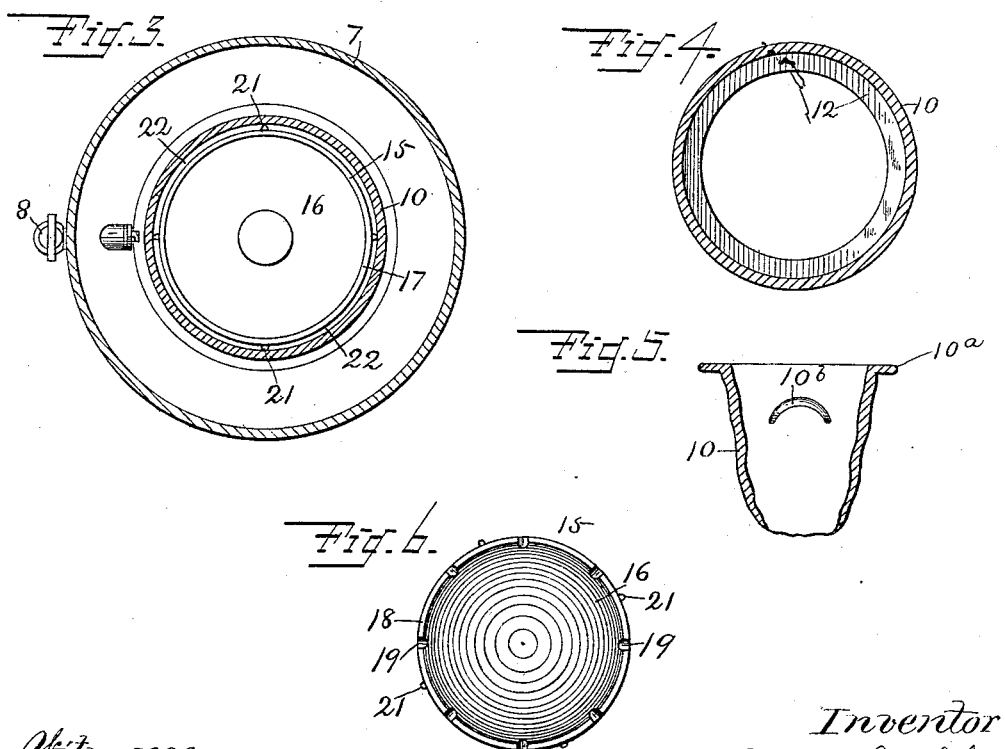
Witnesses:
G. R. Richards.
H. M. Richards.
Inventor:
Dennis Melcher
By W. B. Richards
Atty.

UNITED STATES PATENT OFFICE.

DENNIS MELCHER, OF MONMOUTH, ILLINOIS, ASSIGNOR TO THE MONMOUTH POTTERY COMPANY, OF SAME PLACE.

WATER COOLER AND FILTER.

SPECIFICATION forming part of Letters Patent No. 633,698, dated September 26, 1899.

Application filed November 22, 1897. Serial No. 659,510. (No model.)

*To all whom it may concern:*

Be it known that I, DENNIS MELCHER, a citizen of the United States, residing at Monmouth, in the county of Warren and State of Illinois, have invented certain new and useful Improvements in Water Coolers and Filters, of which the following is a specification.

This invention relates to a composite structure—a water cooler and filter—and to parts thereof which have no movements in relation to each other in operation and in that sense have not machinal but have a constructive function in the article of manufacture.

The objects of the invention are hereinafter described.

The main feature of the invention consists in a water cooler and filter which comprises in its construction a cooling and filtering vessel suspended within a water-delivering vessel and provided with a filtering-bottom, above which is an imperforate disk for supporting the ice, which disk has an annular flange projecting upwardly from its outer edge or periphery, whereby it will receive and retain or hold sediment that settles from the water supplied to said cooling and filtering vessel and that may settle from the water formed by the melted ice, and has an annular depending flange projecting downwardly from its outer edge or periphery, which flange rests and supports said disk on the filtering-disk or the cement which binds the outer edge of the filtering-disk to the cooling and filtering vessel, and which depending flange has openings therethrough through which the water passes directly to the upper surface of the filtering-disk.

The invention further consists in constructions and combinations hereinafter described and made the subject-matter of claims herewith.

Mechanism embodying the preferred constructive forms of and showing the mutual relationship, disposition, and combination of the parts forming the subject-matter of my improvements is illustrated in the accompanying drawings, in which—

Figure 1 is a side elevation of the apparatus; Fig. 2, a vertical central sectional elevation; Fig. 3, a sectional plan in the line 3 3 in Fig. 2; Fig. 4, a sectional plan in the line 4 4 in Fig. 2; Fig. 5, a detail hereinafter described; Fig. 6, a plan of the sediment-receiving flanged disk, seen from below.

The outer water-delivering vessel or jar (designated by the numeral 7 and preferably formed of earthenware) has the usual delivery-faucet 8 and lid or cover 9. The cooling and filtering vessel 10 is suspended in the vessel or jar 7 by means of an annular flange $10^a$, which projects from its upper part and rests upon the upper edge or rim of the jar or vessel 7, while the lid or cover rests upon the flange 8 and has an annular rim 11 projecting downwardly into the vessel 10. The vessel 10 has integral handles $10^b$ projecting from its inner side, by means of which said vessel may be readily and easily removed from the vessel 7 for cleaning the filter hereinafter described or for other purposes.

The cooling and filtering vessel 10 is open at both its upper and lower ends and has a flange 12 projecting inwardly from its lower end. A filtering disk or plate 13, of any suitable water-filtering material, is sustained upon and fixed to the flange 12 and the adjacent inner side of the vessel 7 by intermediate cement 14. (See Fig. 2.) The sediment-collecting cup or disk 15 is formed of an imperforate concavo-convex central part or bottom 16, or it is sufficient for its purpose if its upper side is convex, to increase its resistance to breakage by dropping cakes of ice thereonto. An annular flange 17 projects upward from the periphery of the bottom 16, and a similar flange 18 projects downwardly from its lower side and periphery. The flange 18 has grooves or openings 19 in its lower edge. The cup or disk 15 is seated, with the flange 18 resting on the cement 14 and with its outer peripheral part a short distance from the inner surface of the vessel 7, as shown best at Fig. 2, and has a knob or handle 20, by which it may be readily and easily placed in the vessel 10 or removed therefrom. Lugs 21, projecting from the peripheral surface of the cup or disk 15, will insure its proper seating above the filter disk or plate 13 and concentric with the adjacent inner surface of the vessel 7. This last-recited feature is important, as it is essential to have a very narrow opening 22 between the cup or disk 15 and the adjacent inner surface of the vessel 7. I have found by experience that an opening of about one-eighth of an inch in width is efficient, and without the lugs 21 it might be carelessly seated eccentric to the outer vessel, and thereby with an opening of one-fourth of an inch at one side. The flange 17 is very low, whereby the cup inclosed and partly formed thereby will hold but little water.

The ice will rest on the bottom 16 of the cup or disk 15, as also the water which is supplied to the inner vessel 10, and the coarser fecula sediment or impurities contained in said water or in the water from the melting ice will settle on the imperforate bottom 16 and be detained there by the flange 17, while the thus to some extent purified water above will flow over the top of the flange 17, and thence downwardly between said flange and the inner surface of the vessel 7 to the openings 19, through which it will pass direct to the upper surface of the filter 13 for passage therethrough and into the water-delivery vessel 7.

The cup or disk 15 can be quickly and easily removed and easily cleaned by simply washing it, and by thus preventing the coarser sedimentary material or other impurities from accumulating on the surface of the filter 13 not only its effectiveness will be increased, but the ordinary necessity of frequent removal thereof for cleaning will be obviated. The filter 13 may be readily and easily cleaned by removing the vessel 10 from the vessel 7 and then inverting the vessel 10 and forcing water through the filter from its normally lower side.

Having thus described my invention, what I claim as new, and desire to secure by Letters Patent, is—

1. A water cooler and filter comprising an outer water-delivering vessel, an inner ice and water holding vessel open at both its upper and lower ends, supported in said outer vessel and having an internal flange at its lower end, a filtering material supported on said flange and through which the water is adapted to pass to the outer vessel, and an imperforate sediment-collecting disk supported above said filtering material and having an upper sediment-retaining wall forming with the upper face of the disk a cup, and a lower flange provided with grooves or holes for the passage of water to said filtering material, substantially as described.

2. A water cooler and filter comprising an outer water-delivering vessel, an inner ice and water holding vessel open at both its upper and lower ends, supported in said outer vessel and having an internal flange at its lower end, a filtering-plate supported on said flange and constituting a bottom for the inner vessel through which the water is adapted to pass directly to the outer vessel, a sediment-collecting disk having a central imperforate part with a convex upper surface supported above said filtering material and having an upper sediment-retaining wall forming with the upper surface of the disk a cup, and a lower flange provided with grooves or holes for the passage of water to said filtering material, substantially as described.

3. A water cooler or filter comprising an outer vessel, an inner vessel having both its upper and lower ends open, an upper supporting-flange for the inner vessel, an inwardly-projecting flange at the lower end of the inner vessel, a filtering-plate supported on said flange and constituting the bottom of said inner vessel, a sediment-collecting disk having a central imperforate part with a convex upper surface, an upper peripheral wall forming with the upper surface of the disk a sediment-retaining cup, a lower flange provided with notches or grooves in its lower edge for the passage of water, and lugs projecting from the periphery of said cup, substantially as described.

In testimony whereof I affix my signature in presence of two witnesses.

DENNIS MELCHER.

Witnesses:
W. D. BRUETON,
C. F. CAMPBELL.